Sept. 28, 1937.     J. M. GWINN, JR     2,094,488
AIRCRAFT
Filed April 28, 1937
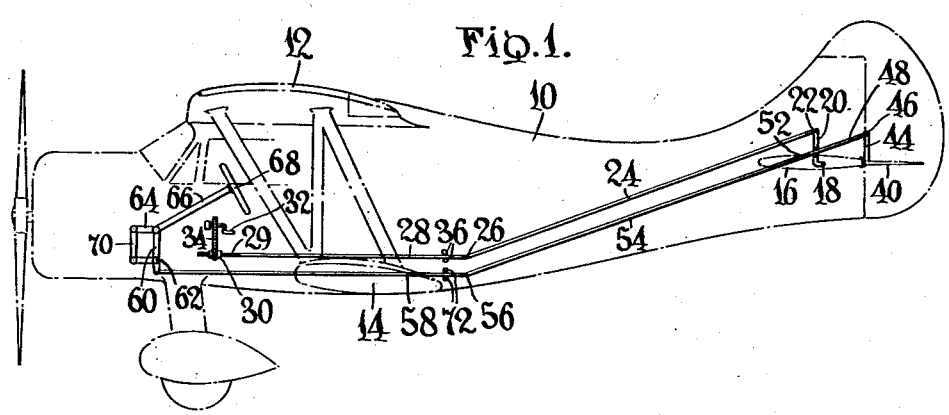
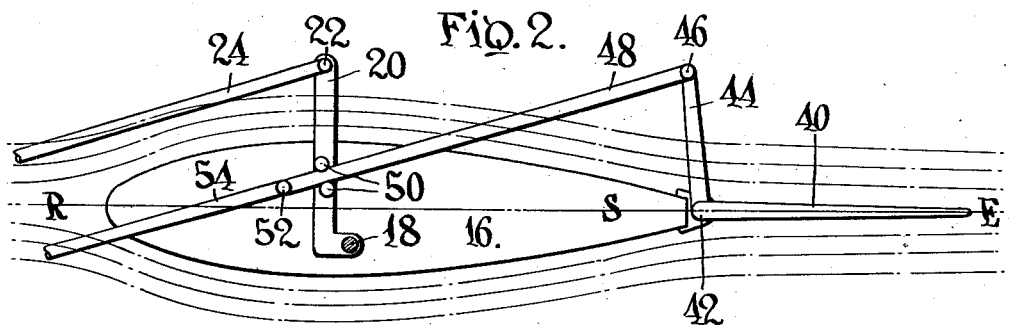
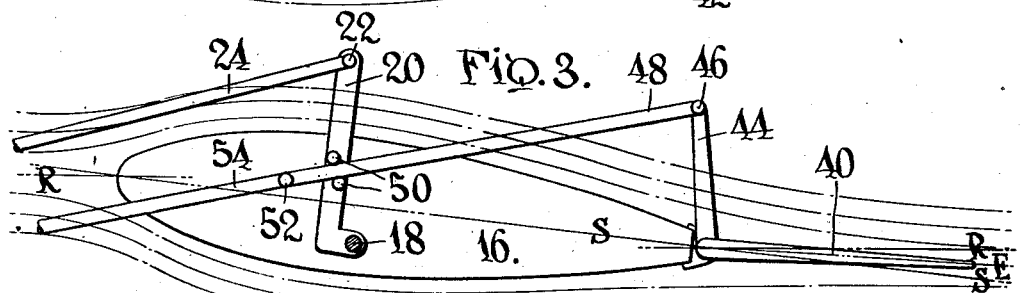
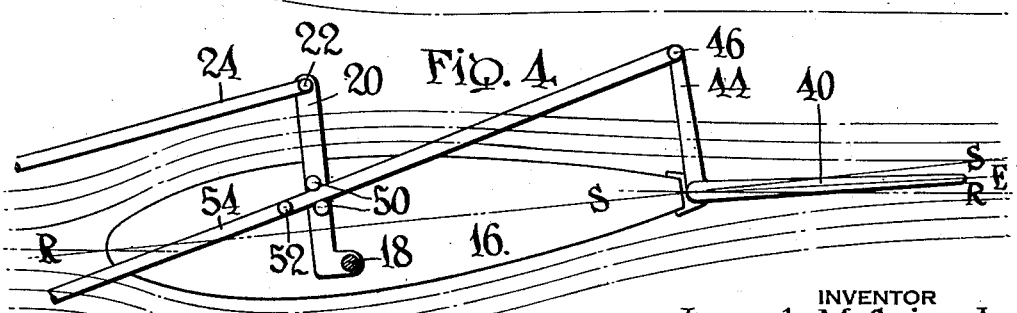
INVENTOR
Joseph M. Gwinn, Jr.,
BY
Beau, Brooks, Buckley & Beau.
ATTORNEYS Patented Sept. 28, 1937

2,094,488

UNITED STATES PATENT OFFICE 2,094,488

AIRCRAFT

Joseph M. Gwinn, Jr., Buffalo, N. Y.

Application April 28, 1937, Serial No. 139,525

8 Claims. (Cl. 244—87)

This invention relates to aircraft, and more particularly to control mechanism for governing the flight thereof.

It is common practice to provide aircraft with airfoils or fins auxiliary to the main wing or wings for stability and control purposes. These auxiliary surfaces may be in the form of vertical and horizontal fins at the tail of the craft and are usually provided with movable flaps hinged to their trailing edges for directional and longitudinal maneuvering control purposes. The movable flap carried by the vertical fin is known as the rudder; the horizontal fin is known as the tail plane or stabilizer, and the adjoining flap is known as the elevator.

The stabilizer is commonly hinged to the fuselage and provided with control means operable from the pilot's seat to adjust its angular relation to the relative wind stream to trim or balance the airplane under different conditions of speed and center of gravity location, and to alter the angle of the flight path to the horizon.

While a properly adjusted stabilizer setting will trim an airplane and permit cruising at any desired speed with the pilot's hands off the control stick, the direction of the air stream trailing the stabilizer is varied for each position of stabilizer adjustment and thus the free floating or neutral elevator position varies accordingly in its angular relation to the stabilizer and the fuselage. It is customary to arrange the elevator actuating means without regard to the location of the axis of the stabilizer hinge, and for every adjusted position of the stabilizer there is, therefore, a corresponding and different position of the pilot control member for neutral or hands off flight.

To simplify the problems of aircraft control and to reduce the degree of pilot technique prerequisite to safe flying it is desirable to provide an aircraft control system which obviates the disadvantages of a fluctuating neutral position of the pilot control member, and one object of the present invention is to provide control means for related airfoils whereby changes may be made in the position of one of the airfoils without diverting the other airfoil from a free floating position in the surrounding airstream and without altering the neutral position of the connected pilot control device.

Another object of the invention is to provide an airfoil auxiliary to the main sustaining wings of an airplane adjustable for longitudinal or directional stability purposes and a control flap articulated to the rear edge of the auxiliary airfoil having actuating means adapted to exert control forces upon the flap supported at a predetermined distance from the axis of rotation of the auxiliary airfoil, whereby movement of the auxiliary airfoil will automatically dispose the control flap in a free floating position in the new resultant airstream trailing the auxiliary airfoil without shifting the neutral position of the pilot control member connected to the control flap.

The invention is exemplified in a structure comprising an airfoil such as a vertical fin or a horizontal stabilizer pivotally mounted upon the fuselage of an aircraft for adjustment to various positions of angular relation to the relative wind stream, and a flap hingedly connected to the trailing edge of the airfoil or otherwise associated with the latter for movement relative thereto for control purposes. The auxiliary airfoil and the flap are provided with pilot operable actuating means which are so interconnected that movement of the auxiliary airfoil to any position of adjustment automatically transmits the proper relative movement to the flap to dispose it in a free floating position in the new resultant airstream trailing the auxiliary airfoil without appreciably shifting the position of the pilot control member connected to the flap.

The invention may be adapted with equal facility to vertical articulated fin and rudder structures to enable the pilot to move the fin to various adjusted positions to compensate for side dragging forces such as those produced by propeller race rotation or unequal motor speeds in the case of multimotored aircraft; or to horizontal stabilizer and elevator structures for longitudinal control purposes.

In the drawing:

Fig. 1 is a diagrammatic view in elevation of an airplane embodying the invention in connection with a horizontal stabilizer and elevator control mechanism;

Fig. 2 is an enlarged detailed view of a portion of the control mechanism; and

Figs. 3 and 4 are diagrammatic views showing the control mechanism of Fig. 2 in different operative positions.

The drawing illustrates an airplane of the biplane type comprising generally a fuselage 10 and upper and lower main sustaining wings 12 and 14 respectively. An auxiliary airfoil 16 of a horizontal stabilizer type is provided at the rear end of the fuselage extending laterally from each side thereof. The stabilizer 16 is mounted, as indicated at 18, upon the fuselage by means of a conventional hinge connection for limited pivotal movement about an axis transverse to the longitudinal axis of the fuselage 10. A conventional adjusting means for the stabilizer is illustrated as comprising an upright horn 20 rigidly mounted upon the stabilizer 16 and extending laterally therefrom to a pivotal connection at 22 to one end of a conventional push-pull tube 24. The other end of the tube 24 is pivotally connected at 26 to another tube 28 which is provided with screw threads 29 for engagement with an internally threaded nut 30 which is supported by a conventional bearing means (not shown) on the fuselage in such manner that the nut is free to rotate about the axis of its bore but is held against longitudinal movement relative thereto. The nut 30 is adapted to be rotated by movement of a crank handle 32 through connected chain or gearing means 34 which is supported upon the fuselage within convenient reach of the pilot. Thus rotation of the handle 32 will rotate the nut 30 and cause longitudinal movements of the tubes 28 and 24 and a corresponding rotation of the stabilizer 16 about its hinge connection 18 to the fuselage 10. A pair of guide rollers 36 are provided to maintain the tube 28 in proper axial alignment.

A flap 40 of the type generally known as an elevator, is connected in articulated relation to the rear edge of the stabilizer 16 by means of a hinge 42. A horn 44 rigidly connected to the elevator 40 extends laterally therefrom and is pivotally connected at 46 to one end of a push-pull tube 48 for actuation of the elevator 40 about its hinged connection to the stabilizer 16. A pair of guide rollers 50 rotatably mounted upon the horn 20 of the stabilizer 16 in relative spaced relation receive an intermediate portion of the tube 48 therebetween to slidably maintain the tube 48 at a predetermined distance from the line of the axis of the stabilizer hinge 18.

Any conventional form of pilot control and connecting means may be provided for actuation of the tube 48 and the elevator 40. In the example illustrated in Fig. 1 the remote end of the tube 48 is pivotally connected at 52 to one end of a conventional push-pull tube 54, the other end of which is pivotally connected at 56 to another push-pull tube 58 which is connected at its opposite end to one end of an upright lever 60. The lever 60 is pivotally connected to the fuselage 10 at 62, and at its upper end is pivotally connected to a bar 64 provided with an extending control column 66 mounting a pilot control wheel 68. A link 70 is arranged parallel to the lever 60 and pivotally connected at its lower end to the fuselage 10 and at its upper end to the bar 64. The mechanism comprising this pilot control means is the subject matter of another invention and is shown and explained more fully in my co-pending application Serial No. 128,255. Thus, movement of the pilot wheel 68 forwardly or rearwardly of the fuselage about the pivot point 62 will cause longitudinal movements of the tubes 58, 54 and 48 to raise or depress the rear edge of the elevator 40 for longitudinal control purposes. A pair of guide rollers 72 maintain tube 58 in proper alignment.

Figure 2 illustrates the arrangement and relative position of the members comprising the stabilizer and elevator and adjacent portions of the control members when the stabilizer is presented edgewise to the relative wind stream. The airstream trailing behind the stabilizer 16 converges symmetrically in lines of motion curving smoothly into lines substantially parallel to the zero lift line S of the stabilizer. Thus, the surrounding airstream tends to sustain the elevator 40 in the position shown wherein the center line E of the elevator 40 coincides with the zero lift line S of the stabilizer and the direction of the original airstream R, and the control transmitting members connected to the elevator support the pilot control wheel 68 at an intermediate or neutral position. In this position the elevator floats in the airstream and the control wheel 68 will remain in its neutral position without attention by the pilot.

When conditions are such that the arrangement shown in Fig. 2 will not provide balanced flight of the desired attitude, the airplane may be trimmed by adjustment of the stabilizer 16 about its pivotal connection 18 to the fuselage, thus producing a corrective turning moment about the lateral axis of rotation of the airplane. Changes in speed and shifting locations of the center of gravity of the load being carried require adjustments of this nature to relieve the pilot from the necessity of applying constant corrective pressures upon the control flaps over tedious periods of time. Likewise, if it is desired to alter the attitude of flight with respect to the horizon, a suitable adjustment of the stabilizer will provide the necessary balance of aerodynamic forces to produce the desired result. Fig. 3 illustrates the stabilizer and adjacent control members and the adjacent airstream when the stabilizer is adjusted to a nose up position with relation to the original airstream. Fig. 4 illustrates the mechanism, when the stabilizer is moved to a nose down position.

As illustrated in Figs. 3 and 4, whenever an airfoil is presented at an angle to the relative wind the converging trailing airstreams produce a region immediately behind the trailing edge of the airfoil wherein the lines of motion are symmetrical about a common center line disposed somewhere between an extension of the zero lift line of the airfoil and the direction of the original line of motion of the relative wind (indicated by R). Thus, a neutral or free floating position for a flap hinged to the trailing edge of the airfoil under such conditions exists at some position between the lines S and R. The exact location of this free floating position will vary with the dimensions and aerodynamic characteristics of the airfoil and the flap.

In accordance with the present invention the control link 48 for imposing control movements upon the elevator 40 is offset at some predetermined distance from the axis of the hinge 18. In different cases the degree of offset will vary to suit the different conditions of stabilizer and elevator characteristics so that movement of the stabilizer 16 to any adjusted position will automatically transmit to the elevator 40 the proper relative motion to permit the elevator 40 to assume a free floating position in the new resultant airstream immediately behind the stabilizer, without causing movement of the control member 54. The position of the guide rollers 50 relative to the axis of the hinge 18 and the length of the horn 44 must therefore be varied to suit different conditions, but for every arrangement of articulated airfoils there will be a proper relation between the length of the horn 44 and the position of the rollers 50 to automatically provide substantially the proper degree of movement of the elevator 40 relative to the stabilizer 16 so that the elevator 40 will assume a floating position in the new trailing airstream without appreciably shifting the neutral position of the pilot control wheel 68. Obviously, the guide rollers 50 may be mounted upon any suitable part of the aircraft, and have been shown as mounted directly upon the horn 20 of the drawing merely by way of illustration. For instance, these rollers may be mounted directly upon a stationary portion of the airplane structure, as the motion of the rollers 50 about the pivotal connection 18 as hereinabove described is not germane to the principle of the invention.

Although only one form of the invention has been shown and described in detail, it will be apparent to those skilled in the art that the invention is not so limited but that various changes can be made therein without departing from the spirit of the invention or from the scope of the appended claims.

I claim:

1. In an aircraft, a stabilizing airfoil, pilot operable adjustment means connected to said airfoil for altering its disposition relative to the aircraft, a control flap movable relative to said stabilizer airfoil, pilot operable actuating means connected to said control flap, means connecting said control flap actuating means and said airfoil adjusting means for automatically compensating for changes in the position of the airfoil and the resultant direction of the airstream adjacent said control flap whereby said control flap is permitted to assume adjusted free floating positions in the adjacent airstream without appreciably shifting the pilot end of the control flap actuating means.

2. In an aircraft, an airfoil adjustably mounted thereon, means connected to said airfoil for adjustment purposes, a flap articulated to the trailing edge of said airfoil, actuating means connecting said flap and a pilot operable control member, means associating said flap actuating means and said airfoil adjusting means automatically compensating for changes in the disposition of said airfoil to allow said flap to assume adjusted positions relative to said airfoil and in free floating relation in the airstream trailing said airfoil without appreciably moving the position of said pilot control member.

3. In an aircraft, a stabilizing airfoil pivotally mounted for adjustment to change its disposition relative to the aircraft, a flap connected to said airfoil, actuating means connecting said flap to a pilot operable control member, means maintaining said flap actuating means in predetermined spaced relation from the axis of the pivotal mounting of said airfoil whereby movements of the airfoil to various positions of adjustment are automatically compensated for to allow said flap to assume free floating positions in the resulting airstreams without appreciably shifting the position of the pilot control member.

4. In an aircraft, a stabilizing airfoil pivotally mounted upon said aircraft, pilot operable means for moving said stabilizing airfoil to various positions of adjustment, a control flap articulated to said stabilizing airfoil, a horn projecting from said flap, actuating means connecting a pilot operable member to said horn, an arm connecting said flap actuating means and said stabilizing airfoil, said arm and said horn being of predetermined relative length whereby movement of the stabilizing plane will automatically cause the control flap to be moved to a free floating position in the adjacent airstream without appreciably shifting the position of the pilot control member.

5. In an aircraft having an airfoil pivotally mounted thereon and producing a deflected airstream in response to aircraft flight, a control flap normally disposed in a neutral free floating position in the deflected airstream, means for articulating said flap relative to said airfoil, a first actuating means connected to the control flap and operable independently of the airfoil for actuating said flap, a second actuating means connected to the airfoil for pivotally adjusting the latter and varying the airstream deflection thereabout, means spaced from the pivotal axis of the airfoil and carried by the latter in connected relation to the control flap and being responsive to pivotal adjustment of the airfoil to maintain the control flap in a neutral position in the deflected airstream created by the airfoil in its adjusted position.

6. In an aircraft having an airfoil movably mounted thereon and producing a deflected airstream in response to aircraft flight, a control flap normally disposed in a neutral free floating position in the deflected airstream and having means associating it movably relative to the airfoil, a projection on the control flap, a first actuating means connected to said projection and operable independently of the airfoil for actuating said flap, a second actuating means connected to the airfoil for moving the latter, an extension on the airfoil guidably receiving the first actuating means whereby the control flap is maintained in a free floating neutral position in the deflected airstream created by the airfoil regardless of the position of the latter.

7. In an aircraft having an airfoil movably mounted thereon, a control flap normally disposed in a neutral free floating position and having means associating it movably relative to the airfoil, a first actuating means connected to the control flap and operable independently of the airfoil for actuating said flap, a second actuating means connected to the airfoil for moving the latter, and means operatively connecting the airfoil and control flap and responsive to movement of the airfoil to maintain the control flap in a neutral free floating position, according to movement of the airfoil.

8. In an aircraft, an airfoil movably mounted thereon and producing a deflected airstream in response to aircraft flight, a second airfoil movably mounted upon said aircraft within the region of said deflected airstream, a first actuating means connected to said first mentioned airfoil for actuation of the first mentioned airfoil, a second actuating means connected to said second airfoil for actuation of the second airfoil, and means in addition to said second actuating means operatively associated with said second actuating means to automatically move said second mentioned airfoil to free floating neutral positions in the adjusted airstreams created by movement of the first mentioned airfoil to various positions.

JOSEPH M. GWINN, Jr.